United States Patent
Xu et al.

(10) Patent No.: US 11,232,288 B2
(45) Date of Patent: Jan. 25, 2022

(54) IMAGE CLUSTERING METHOD AND APPARATUS, ELECTRONIC DEVICE, AND STORAGE MEDIUM

(71) Applicant: SHENZHEN SENSETIME TECHNOLOGY CO., LTD., Shenzhen (CN)

(72) Inventors: Jing Xu, Shenzhen (CN); Rui Zhao, Shenzhen (CN)

(73) Assignee: SHENZHEN SENSETIME TECHNOLOGY CO., LTD., Shenzhen (CN)

(*) Notice: Subject to any disclaimer, the term of this patent is extended or adjusted under 35 U.S.C. 154(b) by 31 days.

(21) Appl. No.: 16/914,705

(22) Filed: Jun. 29, 2020

(65) Prior Publication Data
US 2020/0327311 A1    Oct. 15, 2020

Related U.S. Application Data

(63) Continuation of application No. PCT/CN2019/101858, filed on Aug. 21, 2019.

(30) Foreign Application Priority Data

Mar. 18, 2019    (CN) .......................... 201910204426.1

(51) Int. Cl.
*G06K 9/00*    (2006.01)
*G06K 9/62*    (2006.01)
(Continued)

(52) U.S. Cl.
CPC ......... *G06K 9/00288* (2013.01); *G06F 17/16* (2013.01); *G06K 9/623* (2013.01);
(Continued)

(58) Field of Classification Search
CPC ............ G06K 9/00288; G06K 9/6215; G06K 9/6223; G06K 9/623; G06K 9/6256; G06F 17/16; G06N 3/02
See application file for complete search history.

(56) References Cited

U.S. PATENT DOCUMENTS

| | | |
|---|---|---|
| 2006/0251338 A1 | 11/2006 | Gokturk |
| 2009/0180671 A1 | 7/2009 | Lee et al. |

(Continued)

FOREIGN PATENT DOCUMENTS

| | | |
|---|---|---|
| CN | 103902689 A | 7/2014 |
| CN | 105574512 A | 5/2016 |

(Continued)

OTHER PUBLICATIONS

Aparajita Nanda et al, "Person Re-identification Using Clustering Ensemble Prototypes," 2015, ACCV 2014 Workshops, Part III, LNCS 9010, pp. 96-108 (13 pages) (Year: 2015).*

(Continued)

*Primary Examiner* — David F Dunphy
(74) *Attorney, Agent, or Firm* — Cooper Legal Group, LLC

(57) ABSTRACT

An image clustering method and apparatus, an electronic device, and a storage medium are provided. The method includes: obtaining a face feature and an attribute feature of each image in an image set; performing clustering processing on the image set by using a similarity of the face feature of each image in the image set to obtain at least one first class group, images included in each first class group being predicted images including a same object; determining a similarity matrix for each first class group by using the face features and the attribute features of the images in each first class group; and re-clustering the images in each first class group based on the similarity matrix corresponding to each first class group and the face features of the images in each (Continued)

first class group to obtain at least one second class group, images in the second class group being optimized predicted images having a same object.

20 Claims, 9 Drawing Sheets

(51) Int. Cl.
*G06F 17/16* (2006.01)
*G06N 3/02* (2006.01)
(52) U.S. Cl.
CPC ......... *G06K 9/6215* (2013.01); *G06K 9/6223* (2013.01); *G06K 9/6256* (2013.01); *G06N 3/02* (2013.01)

(56) References Cited

U.S. PATENT DOCUMENTS

| | | | |
|---|---|---|---|
| 2016/0379044 A1 | 12/2016 | Tang et al. | |
| 2017/0132457 A1 | 5/2017 | Zhu et al. | |
| 2020/0218755 A1* | 7/2020 | Ke | G06F 16/55 |

FOREIGN PATENT DOCUMENTS

| | | | |
|---|---|---|---|
| CN | 105654039 A | 6/2016 | |
| CN | 105868309 A | 8/2016 | |
| CN | 106250821 A | 12/2016 | |
| CN | 106355170 A | 1/2017 | |
| CN | 106815566 A | 6/2017 | |
| CN | 107609466 A | 1/2018 | |
| CN | 108154092 A | 6/2018 | |
| CN | 108171191 A | 6/2018 | |
| CN | 108229419 A | 6/2018 | |
| CN | 108280477 A | 7/2018 | |
| CN | 108491872 A | 9/2018 | |
| CN | 108875522 A | 11/2018 | |
| CN | 108960043 A | 12/2018 | |
| CN | 109063737 A | 12/2018 | |
| CN | 109117803 A | 1/2019 | |
| CN | 109117808 A | 1/2019 | |
| CN | 109800744 A | 5/2019 | |
| JP | 2010250634 A | 11/2010 | |
| TW | 201828156 A | 8/2018 | |

OTHER PUBLICATIONS

Second Office Action of the Chinese application No. 201910204426.1, dated Feb. 5, 2021, 24 pgs.
International Search Report in the International application No. PCT/CN2019/101858, dated Dec. 23, 2019, 3 pgs.
Xiande Hu, etc., Aging Face Image Synthesis Based on Clustering Algorithm, Journal of Changchun Normal University, vol. 35, No. 10, Oct. 31, 2016, p. 34-38.
Semi-Supervised Classification with Graph Convolutional Networks:; Feb. 2017; Thomas N. Kipf and Max Welling; Published as a Conference Papaer at ICLR, pp. 1-14.
"Face Recognition Technology and Application", Aug. 2018, Siong Xin, 7 pgs.
"MATLAB Realization of Pattern Recognition and Intelligent Calculation"; Aug. 2017; Xu Guogen, Jia Ying and Han Qilong; 5 pgs.
First Office Action of the Chinese application No. 201910204426.1, dated Jun. 18, 2020, 22 pgs.
Notice of Allowance of the Chinese application No. 201910204426.1, dated Jul. 28, 2021, 5 pgs.
English translation of the Written Opinion of the International Search Authority in the international application No. PCT/CN2019/101858, dated Dec. 23, 2019, 5 pgs.

* cited by examiner

IMAGE CLUSTERING METHOD AND APPARATUS, ELECTRONIC DEVICE, AND STORAGE MEDIUM

CROSS-REFERENCE TO RELATED APPLICATIONS

The present disclosure is a U.S. continuation application of International Application No. PCT/CN2019/101858, filed on Aug. 21, 2019, which claims priority to Chinese Patent Application No. 201910204426.1, filed on Mar. 18, 2019. The disclosures of International Application No. PCT/CN2019/101858 and Chinese Patent Application No. 201910204426.1 are incorporated herein by reference in their entireties.

BACKGROUND

Face clustering is a classic problem in computer vision, and aims to divide a bulk of face data according to identities, and gathers face pictures belonging to the same person together. Face clustering plays a very important role in application of multiple fields. For example, in the field of terminals such as a mobile phone, face clustering may classify pictures of people according to identities, so as to facilitate user viewing; in the field of security and protection, face clustering also has very important applications, for example, one person-one file population management may be achieved. However, face pictures have differences in factors such as orientation, illumination, expression, occlusion, and definition in an actual application, and these factors bring great challenges to face clustering.

SUMMARY

The present disclosure relates to the field of computer vision, and in particular, to an image clustering method and apparatus, an electronic device, and a storage medium.

Embodiments of the present disclosure provide an image clustering method and apparatus capable of improving image clustering precision, an electronic device, and a storage medium.

An image clustering method provided according to a first aspect of the present disclosure includes:

obtaining a face feature and an attribute feature of each image in an image set;

performing clustering processing on the image set by using a similarity of the face feature of each image in the image set to obtain at least one first class group, images included in each first class group being predicted images including a same object;

determining a similarity matrix for each first class group by using the face features and the attribute features of the images in each first class group, each element in the similarity matrix representing a respective one of similarities between images in a first class group corresponding to the similarity matrix; and re-clustering the images in each first class group based on the similarity matrix corresponding to each first class group and the face features of the images in each first class group to obtain at least one second class group, images in the second class group being optimized predicted images having a same object.

In some possible embodiments, the performing clustering processing on the image set by using a similarity of the face feature of each image in the image set to obtain at least one first class group includes:

determining similarities between the face features of all images in the image set;

determining, based on the similarities between the face features of all images in the image set, K images with top similarities to the face feature of each image in the image set, K being an integer greater than or equal to 1;

selecting a first image with a face feature similarity exceeding a first threshold from the K images with top similarities to the face feature of each image in the image set; and forming a first class group according to each image in the image set and a first image corresponding to each image in the image set.

In some possible embodiments, a plurality of first thresholds is included, and the performing clustering processing on the image set by using a similarity of the face feature of each image in the image set to obtain at least one first class group further includes:

for different first thresholds, forming a first class group corresponding to each of the first thresholds.

In some possible embodiments, the determining a similarity matrix for each first class group by using the face features and the attribute features of the images in each first class group includes:

determining a face feature similarity matrix for each first class group based on similarities between the face features of the images in a corresponding first class group, and determining an attribute feature similarity matrix for each first class group based on the attribute features of the images in a corresponding first class group, each element in the face feature similarity matrix representing a respective one of similarities between the face features of the images in the first class group, and each element in the attribute feature similarity matrix representing a respective one of similarities between the attribute features of the images in the first class group; and obtaining the similarity matrix for each first class group according to the face feature similarity matrix for each first class group and the attribute feature similarity matrix for each first class group.

In some possible embodiments, the determining an attribute feature similarity matrix for each first class group based on the attribute features of the images in a corresponding first class group includes:

determining an attribute feature of each image in the first class group and attribute feature similarities between the attribute features of all the images in the first class group; and determining the attribute feature similarity matrix for the first class group based on the similarity between the attribute features of all images in the first class group.

In some possible embodiments, elements in an i-th row of the face feature similarity matrix represent similarities between a face feature of an i-th image in the first class group and face features of other images in the first class group;

elements in an i-th row of the attribute feature similarity matrix represent similarities between an attribute feature of the i-th image in the first class group and attribute features of other images in the first class group; and i is an integer greater than or equal to 1 and less than or equal to N, and N represents the number of the images in the first class group.

In some possible embodiments, the similarity between the face features and/or the similarity between the attribute features is a cosine similarity.

In some possible embodiments, the obtaining the similarity matrix for each first class group according to the face feature similarity matrix for each first class group and the attribute feature similarity matrix for each first class group includes:

performing at least one layer of convolution processing on the face feature similarity matrix and the attribute feature similarity matrix of each first class group to obtain the similarity matrix corresponding to each first class group.

In some possible embodiments, the re-clustering the images in each first class group based on the similarity matrix corresponding to each first class group and the face features of the images in each first class group to obtain at least one second class group includes:

preprocessing the similarity matrix corresponding to each first class group to obtain a preprocessed similarity matrix;

performing at least one layer of graph convolution processing on the preprocessed similarity matrix corresponding to each first class group and face features of images in a corresponding first class group to obtain a confidence score matrix for each first class group, each element in the confidence score matrix representing a confidence score that each image in the corresponding first class group is allocated to the first class group; and re-clustering the first class group according to the confidence score corresponding to each image in the first class group to obtain a re-clustered second class group.

In some possible embodiments, the re-clustering the first class group according to the confidence score corresponding to each image in the first class group to obtain a re-clustered second class group includes:

deleting an image with a confidence score less than a second threshold from the first class group to obtain a re-clustered second class group.

In some possible embodiments, the re-clustering the images in each first class group based on the pre-processed similarity matrix corresponding to each first class group and the face features of the images in each first class group to obtain at least one second class group further includes:

further obtaining a class confidence score for each first class group based on the graph convolution processing, the class confidence score representing a classification confidence score of the corresponding first class group; and before the re-clustering the first class group according to the confidence score corresponding to each image in the first class group to obtain a re-clustered second class group, the method further includes:

deleting the first class group in response to the class confidence score of the first class group being less than a third threshold.

In some possible embodiments, the re-clustering the first class group according to the confidence score corresponding to each image in the first class group to obtain a re-clustered second class group includes:

ranking the at least one first class group in a descending order of the class confidence scores; and allocating a j-th label to an image with a confidence score exceeding a second threshold in a j-th first class group, and deleting an image with a confidence score less than the second threshold in the j-th first class group, so as to form a second class group corresponding to the j-th first class group, where j is a positive integer greater than or equal to 1 and less than or equal to M, and M represents the number of the at least one first class groups.

In some possible embodiments, the re-clustering the first class group according to the confidence score corresponding to each image in the first class group to obtain a re-clustered second class group further includes:

after obtaining a second class group corresponding to a M-th first class group, in response to the presence of one or more images in the image set that is not clustered into any second class group, forming a second class group respectively based on the one or more images that are not clustered into any second class group.

In some possible embodiments, preprocessing the similarity matrix corresponding to each first class group to obtain the pre-processed similarity matrix includes:

adding the similarity matrix corresponding to each first class group with a unit matrix.

In some possible embodiments, the obtaining a face feature and an attribute feature of each image in the image set includes:

obtaining the face feature of each image in the image set by using a first neural network; and obtaining the attribute feature of each image in the image set by using a second neural network.

An image clustering apparatus provided according to a second aspect of embodiments of the present disclosure includes:

an obtaining module, configured to obtain a face feature and an attribute feature of each image in an image set;

a first clustering module, configured to perform clustering processing on the image set by using a similarity of the face feature of each image in the image set to obtain at least one first class group, images included in each first class group being predicted images including a same object;

a determining module, configured to determine a similarity matrix for each first class group by using the face features and the attribute features of the images in each first class group, each element in the similarity matrix representing a respective one of similarities between images in a first class group corresponding to the similarity matrix; and a second clustering module, configured to re-cluster the images in each first class group based on the similarity matrix corresponding to each first class group and the face features of the images in each first class group to obtain at least one second class group, images in the second class group being optimized predicted images having a same object.

In some possible embodiments, the first clustering module is further configured to:

determine similarities between the face features of all images in the image set;

determine, based on the similarities between the face features of all images in the image set, K images with top similarities to the face feature of each image in the image set based on the similarities of the face feature, K being an integer greater than or equal to 1;

select a first image with a face feature similarity exceeding a first threshold from the K images with top similarities to the face feature of each image in the image set; and form a first class group according to the image and the corresponding first image thereof.

In some possible embodiments, a plurality of first thresholds is included, and the first clustering module is further configured to, for different first thresholds, form a first class group corresponding to each of the first thresholds.

In some possible embodiments, the determining module includes:

a first determining unit, configured to determine a face feature similarity matrix for each first class group based on similarities between the face features of the images in a corresponding first class group, each element in the face feature similarity matrix representing a respective one of similarities between the face features of the images in the first class group;

a second determining unit, configured to determine an attribute feature similarity matrix for each first class group based on the attribute features of the images in a corresponding first class group, each element in the attribute feature similarity matrix representing a respective one of similarities between the attribute features of the images in the first class group; and a third determining unit, configured to obtain the similarity matrix for each first class group according to the face feature similarity matrix for each first class group and the attribute feature similarity matrix for each first class group.

In some possible embodiments, the second determining unit is further configured to: determine an attribute feature of each image in the first class group and attribute feature similarities between the attribute features of all the images in the first class group; and determine an attribute feature similarity matrix for the first class group based on the similarities between the attribute features of all the images in the first class group.

In some possible embodiments, elements in an i-th row of the face feature similarity matrix represent similarities between a face feature of an i-th image in the first class group and face features of other images in the first class group; and elements in an i-th row of the attribute feature similarity matrix represent similarities between an attribute feature of the i-th image in the first class group and attribute features of other images in the first class group; and i is an integer greater than or equal to 1 and less than or equal to N, and N represents the number of the images in the first class group.

In some possible embodiments, the similarity between the face features and/or the similarity between the attribute features is a cosine similarity.

In some possible embodiments, the third determining unit is further configured to perform at least one layer of convolution processing on the face feature similarity matrix for each first class group and the attribute feature similarity matrix for each first class group to obtain the similarity matrix corresponding to each first class group.

In some possible embodiments, the second clustering module includes:

a preprocessing unit, configured to preprocess the similarity matrix corresponding to each first class group to obtain a preprocessed similarity matrix;

a graph convolution unit, configured to perform at least one layer of graph convolution processing on the preprocessed similarity matrix corresponding to each first class group and face features of images in a corresponding first class group to obtain a confidence score matrix for each first class group, each element in the confidence score matrix representing a confidence score that each image in the corresponding first class group is allocated to the first class group; and a clustering unit, configured to re-cluster the first class group according to the confidence score corresponding to each image in the first class group to obtain a re-clustered second class group.

In some possible embodiments, the clustering unit is further configured to delete an image with a confidence score less than a second threshold from the first class group to obtain a re-clustered second class group.

In some possible embodiments, the graph convolution unit is further configured to obtain a class confidence score for each first class group based on the graph convolution processing, the class confidence score representing a classification confidence score of the corresponding first class group; and the clustering unit is further configured to delete the first class group in response to the class confidence score of the first class group being less than a third threshold.

In some possible embodiments, the clustering unit is further configured to: rank the at least one first class group in a descending order of the class confidence scores; and allocating a j-th label to an image with a confidence score exceeding a second threshold in a j-th first class group, and deleting an image with a confidence score less than the second threshold in the j-th first class group, so as to form a second class group corresponding to the j-th first class group, where j is a positive integer greater than or equal to 1 and less than or equal to M, and M represents the number of the at least one first class group.

In some possible embodiments, the clustering unit is further configured to, after obtaining a second class group corresponding to a M-th first class group, in response to the presence of one or more images in the image set that is not clustered into any second class group, form a second class group respectively based on the one or more images that are not clustered into any second class group.

In some possible embodiments, the preprocessing unit is further configured to add the similarity matrix corresponding to each first class group with a unit matrix to execute the preprocessing.

In some possible embodiments, the obtaining module includes:

a first neural network, configured to obtain the face feature of each image in the image set; and a second neural network, configured to obtain the attribute feature of each image in the image set.

An electronic device provided according to a third aspect of the present disclosure includes: a processor; and a memory configured to store processor-executable instructions; where the processor is configured to execute the method according to any item of the first aspect.

A computer-readable storage medium provided according to a fourth aspect of the present disclosure has computer program instructions stored thereon, where when the computer program instructions are executed by a processor, the method according to any item of the first aspect is implemented.

A computer program product is provided according to a fifth aspect of the present disclosure, where when the computer program product is executed by a processor, the method according to any one of claims 1 to 15 is implemented.

According to the embodiments of the present disclosure, images may be preliminarily clustered according to face features of the images, and then, optimization clustering is performed on the result of the preliminary clustering by using the face features and the attribute features corresponding to the images simultaneously, thereby increasing a similarity between intra-class images, reducing a similarity between inter-class images, and improving clustering precision.

It should be understood that the foregoing general descriptions and the following detailed descriptions are merely exemplary and explanatory, but are not intended to limit the present disclosure. Exemplary embodiments are described in detail below according to the following reference accompanying drawings, and other features and aspects of the present disclosure become clear.

BRIEF DESCRIPTION OF DRAWINGS

The accompanying drawings here are incorporated into the specification and constitute a part of the specification. These accompanying drawings show embodiments that conform to the present disclosure, and are intended to describe the technical solutions in the present disclosure together with the specification.

DETAILED DESCRIPTION

Figure 1:
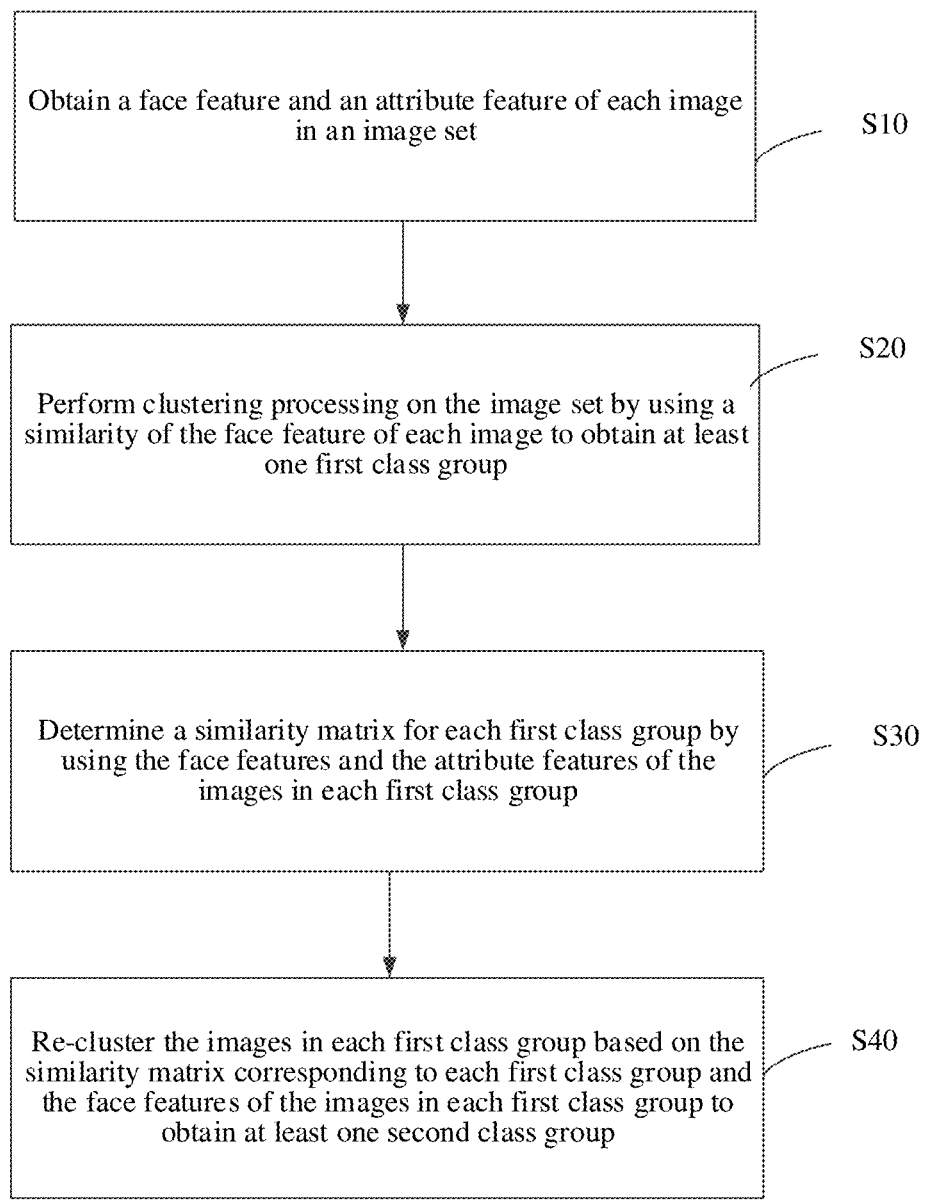
FIG. 1 is a flowchart of an image clustering method according to embodiments of the present disclosure.

The following describes various exemplary embodiments, features, and aspects of the present disclosure in detail with reference to the accompanying drawings. Same reference numerals in the accompanying drawings represent elements with same or similar functions. Although various aspects of the embodiments are illustrated in the accompanying drawings, the accompanying drawings are not necessarily drawn in proportion unless otherwise specified.

The special word "exemplary" here means "used as examples, embodiments, or descriptions". Any "exemplary" embodiment given here is not necessarily construed as being superior to or better than other embodiments.

The term "and/or" herein only describes an association relation between associated objects, indicating that three relations may exist, for example, A and/or B may indicate three conditions, i.e., A exists separately, A and B exist at the same time, and B exists separately. In addition, the term "at least one" herein indicates any one of multiple listed items or any combination of at least two of multiple listed items. For example, including at least one of A, B, or C may indicate including any one or more elements selected from a set consisting of A, B, and C.

In addition, for better illustration of the present disclosure, various specific details are given in the following specific implementations. A person skilled in the art should understand that the present disclosure may also be implemented without the specific details. In some instances, methods, means, elements, and circuits well known to a person skilled in the art are not described in detail so as to highlight the subject matter of the present disclosure.

Embodiments of the present disclosure provide an image clustering method. The method may be used for performing clustering analysis on multiple images, where the clustering result may be optimized by introducing attribute features, so as to improve clustering precision. The image clustering method according to the embodiments of the present disclosure may be applied to any electronic device or server, where the electronic device may include: a User Equipment (UE), a mobile device, a cellular phone, a cordless phone, a Personal Digital Assistant (PDA), a handheld device, a computing device, a vehicle-mounted device, a wearable device, etc., and the server may be a local server or a cloud server. The above is only an exemplary description, and is not intended to be a specific limitation of the present disclosure.

FIG. 1 is a flowchart of an image clustering method according to embodiments of the present disclosure, where the image clustering method includes the following steps.

At S10, a face feature and an attribute feature of each image in an image set are obtained.

At S20, the image set is clustered by using a similarity of the face feature of each image to obtain at least one first class group, images included in each first class group being predicted images including a same object. For example, S20 specifically includes: performing clustering processing on the image set by using a similarity of the face feature of each image in the image set to obtain at least one first class group, images included in each first class group being predicted images including a same object. The predicted images including a same object may be: preliminarily predicted images including a same object.

At S30, a similarity matrix for each first class group is determined by using the face features and the attribute features of the images in each first class group, each element in the similarity matrix representing a respective one of similarities between images in the corresponding first class group.

At S40, the images in each first class group are re-clustered based on the similarity matrix corresponding to each first class group and the face features of the images in each first class group to obtain at least one second class group, images in the second class group being optimized predicted images having a same object. The optimized predicted images having a same object are obtained by, on the basis of preliminary prediction, further performing accurate prediction on the images having a same object and proposing an error result or inaccurate result in the preliminary prediction. The prediction at S20 may be primary prediction, and the prediction at S40 may be secondary prediction based on the primary prediction.

The image clustering method according to the embodiments of the present disclosure aims to realize accurate clustering of the images in the image set. In executing the image clustering method, an image set may first need to be obtained. The image set according to the embodiments of the present disclosure may include multiple images, and objects included in the images may be the same or different. The embodiments of the present disclosure are used for realizing clustering analysis of the images in the image set according to a recognition result of each object in the images, and the images having the same object may be classified into a class through clustering, so that travel trajectory, behaviors, daily routine and the like of the corresponding object can be conveniently analyzed; or, the embodiments of the present disclosure may also be used for archive processing, which is not specifically defined in the present disclosure. According to the embodiments of the present disclosure, the objects included in the images in the image set may be people, and accordingly, clustering of images of people may be realized. In other embodiments, the method according to embodiments of the present disclosure may also be applied in clustering analysis of other types of objects, which is not specifically defined.

In addition, the images in the image set obtained in the embodiments of the present disclosure may be collected by an image device, for example, may be photographed by a terminal device having a photographing function, such as a mobile phone, or can also be collected by a camera device arranged in a monitoring area. In other embodiments, the images may also be obtained by other means, which are not illustrated one by one in the present disclosure. According to the embodiments of the present disclosure, after the image set is obtained, the images in the obtained image set may be analyzed, thereby realizing clustering of the images.

First, at S10, face features and attribute features of each image in an image set are obtained. The face features may include position information of face key points, such as position information of key points of eyes, eyebrows, nose, mouth, ear, chin and forehead, or may include position information of other key points. The above is only an exemplary description, and no limitation is made to the number and type of the face key points in the embodiments of the present disclosure. In addition, the obtained attribute features may be used to represent external features of the object in the image, such as information that may include accessories (glasses, hat, face mask, etc.) worn by the object in the image, skin tone, gender, age, and apparel. In other embodiments, other information may also be included, which are not illustrated one by one therein.

Figure 2:
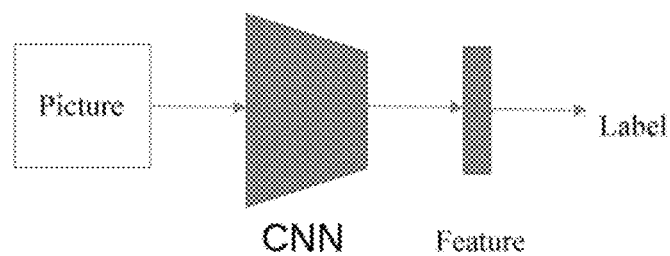
FIG. 2 is a schematic structural diagram of a first neural network according to the embodiments of the present disclosure.

According to the embodiments of the present disclosure, the means for obtaining the face features may include extracting the face features of the face through a face recognition algorithm, or the extraction of the face features of the object in the image is realized through a neural network with a face feature extraction function. For example, in the embodiments of the present disclosure, extraction of the face features of the images in the image set is realized through a first neural network. FIG. 2 is a schematic structural diagram of a first neural network according to the embodiments of the present disclosure. In some possible implementations, the first neural network may be a convolutional neural network. The training process of the first neural network includes: inputting a training image and a corresponding real label to the first neural network, the label being a label for each object in the image; realizing feature extraction of the image by processing operations of the first neural network such as convolution; classifying the extracted features by a classifier to obtain a predicted classification result; and completing training when a loss value between the classification result and a real label satisfies training requirements. In this case, the obtained first neural network can accurately extract the face features of the person in the image. In the embodiments of the present disclosure, the images in the image set may be input to the first neural network and the features extracted from the last layer serve as the face features for subsequent processing.

Figure 3:
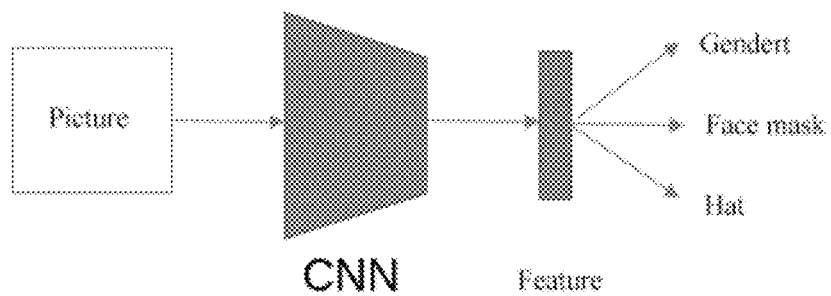
FIG. 3 is a schematic structural diagram of a second neural network according to the embodiments of the present disclosure.

In the embodiments of the present disclosure, the means for obtaining the attribute features may include performing attribute recognition by a corresponding feature extraction algorithm, for example, information such as age, gender, and accessories can be identified through the face features extracted by the face feature extraction algorithm, and information such as apparel worn and gender may also be identified through the extraction of human features. Or, in other embodiments, extraction of the attribute features of the object in the image may also be realized through a neural network having an attribute feature extraction function. For example, in the embodiments of the present disclosure, the extraction of the attribute feature of each image in the image set may be realized through a second neural network. FIG. 3 is a schematic structural diagram of a second neural network according to the embodiments of the present disclosure. In some possible implementations, the second neural network may be a convolutional neural network. The training process of the second neural network includes: inputting a training image and corresponding attribute features to the second neural network; realizing feature extraction of the image by processing operations of the second neural network such as convolution; predicting the attributes by different classifiers to obtain a predicted classification result; and completing training when a loss value between the classification result and real attribute features satisfies training requirements. In this case, the obtained second neural network can accurately extract the attribute features of the person in the image. In the embodiments of the present disclosure, the images in the image set may be input to the second neural network and the features extracted from the last layer serve as the attribute features for subsequent processing.

By means of the embodiments, the extraction of the face feature and the attribute feature of each image in the image set can be realized, and by means of the means above, the obtained face features and attribute features are high in precision, and subsequent classification processing is facilitated.

After the attribute features and the face features of each image are obtained, the images in the image set may be subjected to preliminary clustering through the obtained face features, and the step S20 can be executed. Since the extracted face features may be used for identification of the object, in the embodiments of the present disclosure, whether the objects in the images are the same objects can be determined according to the face features, and the images determined to be the same object are classified into a class, so that the images are classified.

In some possible implementations, a similarity between the face features of the images may be obtained, and all the images B with a face feature similarity to an image A exceeding a similarity threshold in the image set can be classified into one class, so that the images in the image set may be preliminarily classified, so as to obtain at least one first class group. Since the face features and the attribute features obtained in the embodiments of the present disclosure may be in the form of vectors or matrices, the calculation way of obtaining the similarity between the face features may be to calculate a Euclidean distance between the face features of two images, or obtain a cosine similarity between the two images, which is not specifically defined in the embodiments of the present disclosure.

Figure 4:
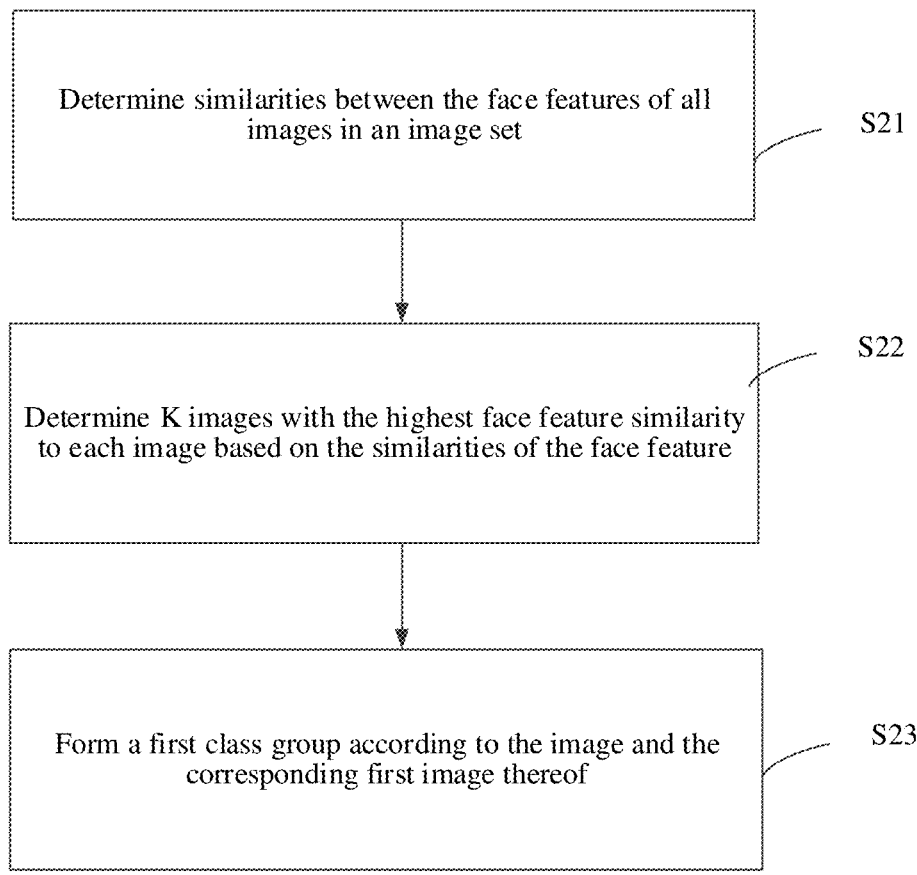
FIG. 4 is a flowchart of step S20 in an image clustering method according to the present disclosure.

In some other possible implementations, in order to improve clustering efficiency, K neighbors of each image may also be determined first, and then images including a same object are selected from the K neighbors. FIG. 4 is a flowchart of step S20 in an image clustering method according to the present disclosure. Performing clustering processing on the image set by using similarities of the face feature corresponding to each image to obtain at least one first class group (step S20) includes: S21. determining similarities between the face features of all images in the image set, i.e., determining similarities between the face features corresponding to all images in the image set; S22. determining K images with the highest face feature similarity to each image based on the similarity between the face features, i.e., determining K images with the highest face feature similarity to the each image based on the similarities of the face feature, K being an integer greater than or equal to 1; S22. selecting a first image with the face feature similarity exceeding a first threshold from the K images with the highest face feature similarity to each image; and S23: forming a first class group according to each image and corresponding first images, i.e., forming a first class group according to the image and the corresponding first image thereof.

As described above, a similarity between the face features of the image is determined based on the face features. In the embodiments of the present disclosure, K images with the highest face feature similarity to each image q may first be selected from the image set, i.e., the images corresponding to K face features with the highest similarity to the face features of the image q. In the embodiments of the present disclosure, K neighbor images in the image set may be retrieved by a FAISS (Facebook AI Similarity Search), i.e., K images which are most similar to the face features of the images. The extraction of K neighbors is achieved by the FAISS, which enables fast extraction of nearest neighbors. In other embodiments, K neighbor images with the highest similarity to the images may also be quickly retrieved by other means, which is not specifically defined in the present disclosure.

After obtaining K neighbor images of each image, i.e., K images with the highest face feature similarity, images meeting preset requirements may be selected from the K images by executing step S23. For example, the images with a face feature similarity exceeding a first threshold may be selected. The value of the first threshold may be set according to requirements, for example, 0.9, or other values, which is not specifically defined in the present disclosure.

In embodiments of the present disclosure, a similarity between each image and corresponding K images, i.e., a face feature similarity, may be obtained. If the face feature similarity exceeds a preset first threshold, the two corresponding images may be classified into the same class. The means for obtaining the similarity between the face features of any two images may be to calculate a Euclidean distance, or to calculate a cosine similarity. The equation of the cosine similarity is:

$$S1 = \cos(\theta) = \frac{A \cdot B}{\|A\|\|B\|} = \frac{\sum_{i=1}^{n} A_i \times B_i}{\sqrt{\sum_{i=1}^{n} (A_i)^2} \times \sqrt{\sum_{i=1}^{n} (B_i)^2}}$$

represented by formula (1), where S1 represents a face feature similarity, A and B represent face features of the two images, respectively, i represents elements in the face features, and n represents the number of elements in the face features.

By means of the means above, images with the face feature similarity to the image q greater than the first threshold may be selected from the obtained K neighbor images of each image q in the image set, and in this case, the selected images can be referred to as the first images. Moreover, the image q and the first images corresponding thereto can be classified into a class (a first class group). If there is no image with a similarity greater than the first threshold in the K neighbor images of the image q, then the image q may be individually classified as a first class group.

In the embodiments of the present disclosure, K neighbor images of each image are retrieved first, and then first images are further screened out according to the first threshold, so that the calculation amount of the face feature similarity is reduced, and the clustering time is saved.

In addition, in some embodiments of the present disclosure, a plurality of first thresholds may be set and, when step S23 is executed, a plurality of sets of first images may be obtained based on each first threshold. For example, a plurality of first images p1 and p2 with a face feature similarity to the image q greater than a first threshold v1 is obtained using the first threshold v1, a plurality of first images p1 with a face feature similarity to the image q greater than a second threshold v2 is obtained using the second threshold v2, and no first image with a face feature similarity to the image q greater than a third threshold v3 is obtained using the third threshold v3, where v3 is greater than v2, and v2 is greater than v1.

Accordingly, for each first threshold, different first class groups may be formed according to the obtained corresponding first images. For example, a first class group {q, p1, p2} is obtained for the first threshold v1, a first class group {q, p1} is obtained for the second threshold v2, and a first class group {q} is obtained for the first threshold v1. That is to say, in the embodiments of the present disclosure, a respective first class group may be obtained according to each first threshold. By setting different thresholds, when subsequent optimization clustering is performed, a case where certain images are not classified or are not accurately clustered into corresponding class groups is avoided, thereby improving clustering precision.

By means of the embodiments, preliminary clustering of the images in the image set may be achieved through the face features. Further, in the embodiments of the present disclosure, the first class group of preliminary clustering may be optimized according to the obtained attribute features and face features, so as to improve clustering precision. First, a face feature similarity matrix of the first type group is obtained according to the face features of the images in the first type group, an attribute feature similarity matrix of the first type group is obtained according to the attribute features of the images in the first type group, and optimization clustering is further performed on the first class group by using the obtained face feature similarity matrix and attribute feature similarity matrix.

Figure 5:
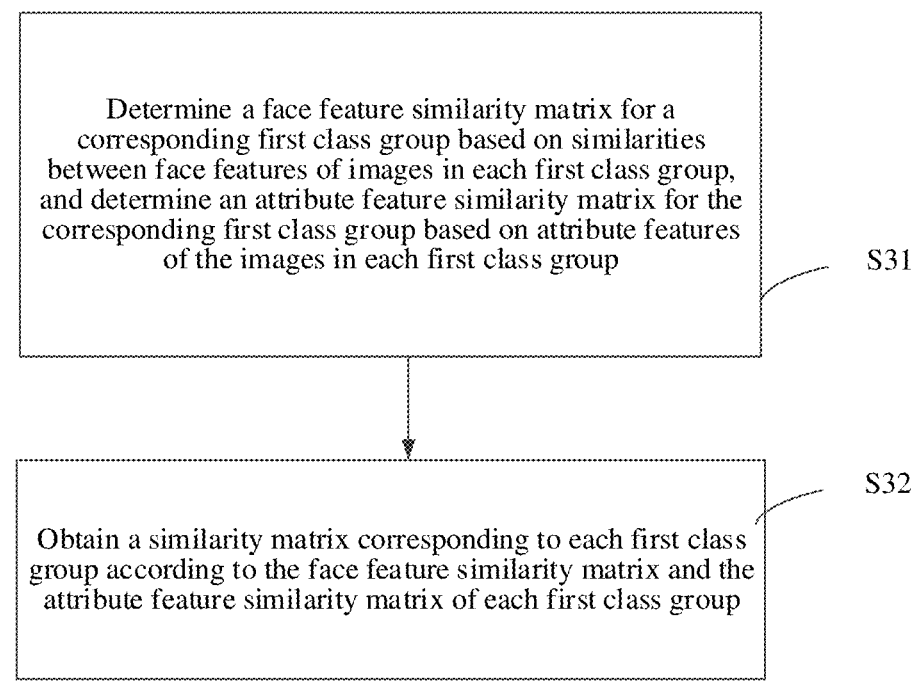
FIG. 5 is a flowchart of step S30 in an image clustering method according to the embodiments of the present disclosure.

FIG. 5 is a flowchart of step S30 in an image clustering method according to the embodiments of the present disclosure. Determining the similarity matrix for each first class group by using the face features and the attribute features of the images in each first class group (step S30) includes the following steps.

At S31, a face feature similarity matrix is determined for a corresponding first class group based on the similarities between the face features of the images in the corresponding first class group, and an attribute feature similarity matrix is determined for a corresponding first class group based on the attribute features of the images in each first class group, an element in the face feature similarity matrix representing a similarity between the face features of the images in the first class group, and an element in the attribute feature similarity matrix representing a similarity between the attribute features of the images in the first class group.

At S32, the similarity matrix corresponding to each first class group is obtained according to the face feature similarity matrix and the attribute feature similarity matrix of each first class group.

In the embodiments of the present disclosure, the face feature similarity of the images in each first class group may be determined. For example, at step S20, the face feature similarity of the images in each first class group is obtained, and in this case, the obtained face feature similarity of the images may be read, or, the face feature similarity of the images in each first class group may also be recalculated, which is not specifically defined in the present disclosure. Moreover, the calculation mode may also be a Euclidean distance calculation mode or a cosine similarity calculation mode.

After the similarity between the face features of any two images in each first class group is obtained, a face feature similarity matrix corresponding to the first class group may be established according to the face feature similarity, where elements in the i-th row of the face feature similarity matrix represent similarities between the face feature of the i-th image in the first class group and the face features of all the other images in the first class group.

Figure 6:
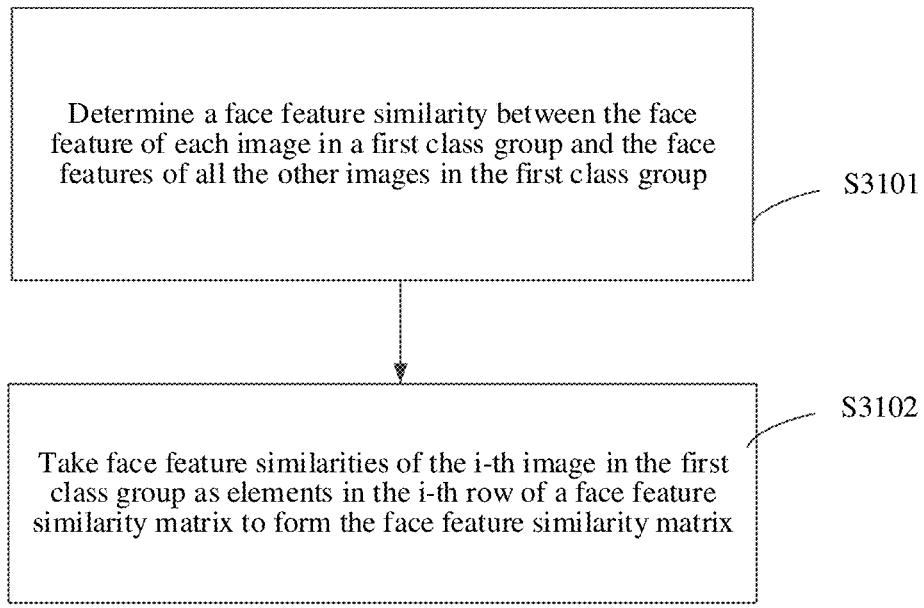
FIG. 6 is a flowchart of step S31 in an image clustering method according to the embodiments of the present disclosure.

FIG. 6 is a flowchart of step S31 in an image clustering method according to the embodiments of the present disclosure. Determining the face feature similarity matrix for each first class group based on the face features of the images in each first class group includes the following steps.

At S3101, a face feature similarity between the face features of each image in the first class group and the face features of all images in the first class group is determined.

As described above, the face feature similarity between any two images in the first class group obtained at step S20 may be read, and the face feature similarity between images may also be recalculated, which are not specifically defined in the present disclosure.

At S3102, face feature similarities of the i-th image in the first class group is used as elements in the i-th row of the face feature similarity matrix to form the face feature similarity matrix, where i is an integer greater than or equal to 1 and less than or equal to N, and N represents the number of images in the first class group.

After the face similarity between every two images in the first class group is obtained, the face feature similarity matrix may be obtained according to the order of the images. The dimension of the face feature similarity matrix may be determined according to the number of images in the first class group, and if N images are included, the face feature similarity matrix is N*N dimension. Dij represents a face feature similarity between the i-th image and the j-th image. Assuming that images c, d, e, and f are included in the first class group, the resulting face feature similarity matrix may be expressed as:

$$D = \begin{vmatrix} D_{cc} & D_{cd} & D_{ce} & D_{ef} \\ D_{dc} & D_{dd} & D_{de} & D_{df} \\ D_{ec} & D_{ed} & D_{ee} & D_{ef} \\ D_{fc} & D_{fd} & D_{fe} & D_{ff} \end{vmatrix}$$

represented by formula (2),
where, Dii represents a similarity between the i-th image and the i-th image, i.e., being 1, and i is the number of c, d, e, and f.

By means of the means above, the face feature similarity matrix may be obtained based on the face feature similarity between any two images in the first class group.

Figure 7:
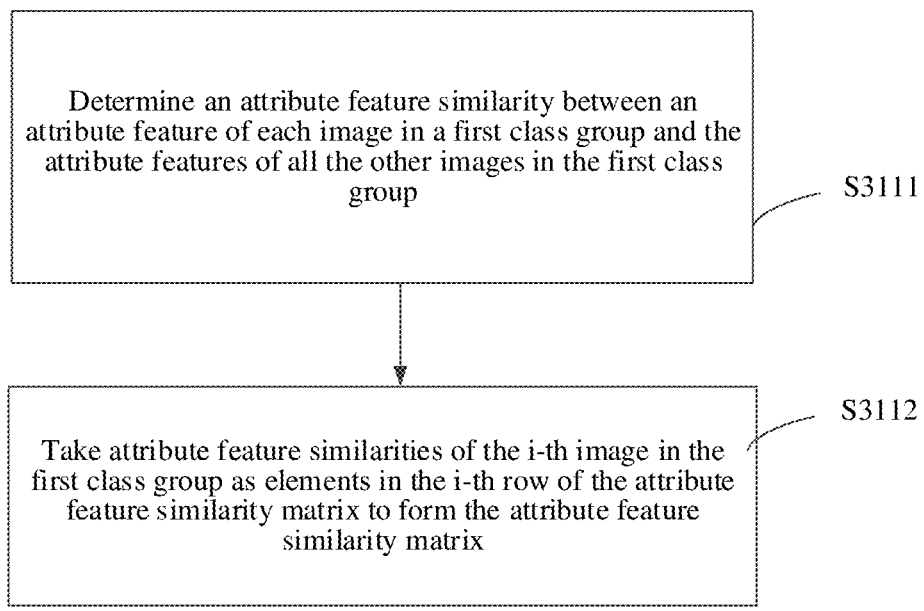
FIG. 7 is another flowchart of step S31 in an image clustering method according to the embodiments of the present disclosure.

Similarly, in the embodiments of the present disclosure, a similarity between the attribute features of the images in each first class group may also be determined, and a corresponding attribute feature similarity matrix corresponding to the first class group may be obtained accordingly. Elements in the i-th row of the attribute feature similarity matrix represent similarities between the attribute feature of the i-th image in the first class group and the attribute features of all the other images in the first class group, i.e., elements in the i-th row of the attribute feature similarity matrix represents a similarity between the attribute features of an i-th image in each first class group and the attribute features of the images in the first class groups. FIG. 7 is another flowchart of step S31 in an image clustering method according to the embodiments of the present disclosure. Determining the attribute feature similarity matrix for the corresponding first class group based on the attribute features of the images in each first class group includes the following steps.

At S3111, an attribute feature similarity between the attribute features of each image in a first class group and the attribute features of all images in the first class group is determined, i.e., the attribute feature of each image in the first class group and attribute feature similarities among the attribute features of all the images in the first class group is determined.

At S3112, attribute feature similarities of the i-th image in the first class group are used as elements in the i-th row of the attribute feature similarity matrix to form the attribute feature similarity matrix, where i is an integer greater than or equal to 1 and less than or equal to N, and N represents the number of images in the first class group.

In some possible implementations, the attribute feature similarity between two images may be determined according to the attribute features of the images, where the Euclidean distance or the cosine similarity between the two attribute features may be calculated, and the attribute feature similarity between any two images is obtained. The calculation of the cosine similarity of the attribute features may be expressed by the following equation:

$$S2 = \cos(\theta) = \frac{C \cdot D}{\|C\|\|D\|} = \frac{\sum_{i=1}^{n} C_i \times D_i}{\sqrt{\sum_{i=1}^{n} (C_i)^2} \times \sqrt{\sum_{i=1}^{n} (D_i)^2}}$$

represented by formula (3),
where S2 represents an attribute feature similarity, C and D represent attribute features of the two images, respectively, i represents elements in the attribute features, and n represents the number of elements in the attribute features.

By means of the means above, the attribute feature similarity between any two images is obtained.

After the attribute similarity between every two images in the first class group is obtained, the attribute feature similarity matrix may be obtained according to the order of the images. The dimension of the attribute feature similarity matrix may be determined according to the number of images in the first class group, and if N images are included, the attribute feature similarity matrix is N*N dimension. Eij represents an attribute feature similarity between the i-th image and the j-th image. Assuming that images c, d, e, and f are included in the first class group, the resulting attribute feature similarity matrix may be expressed as:

$$E = \begin{vmatrix} E_{cc} & E_{cd} & E_{ce} & E_{ef} \\ E_{dc} & E_{dd} & E_{de} & E_{df} \\ E_{ec} & E_{ed} & E_{ee} & E_{ef} \\ E_{fc} & E_{fd} & E_{fe} & E_{ff} \end{vmatrix}$$

represented by formula (4), where Eii represents an attribute feature similarity between the i-th image and the i-th image, i.e., being 1. i is the number of c, d, e, and f.

By means of the means above, the face feature similarity matrix and the attribute feature similarity matrix corresponding to each first class group are obtained respectively, and then the similarity matrix of each image in the first class group may be obtained by using the two feature similarity matrices, and then step S32 can be executed. In the embodiments of the present disclosure, the face feature similarity matrix and the attribute feature similarity matrix corresponding to the first class group are connected to obtain a connection feature matrix, and convolution processing is performed on the connection feature matrix to obtain a final similarity matrix corresponding to each image in the first class group. An element in the similarity matrix corresponding to the first class group may be an image similarity (a face similarity) between images in the first class group.

Figure 8:
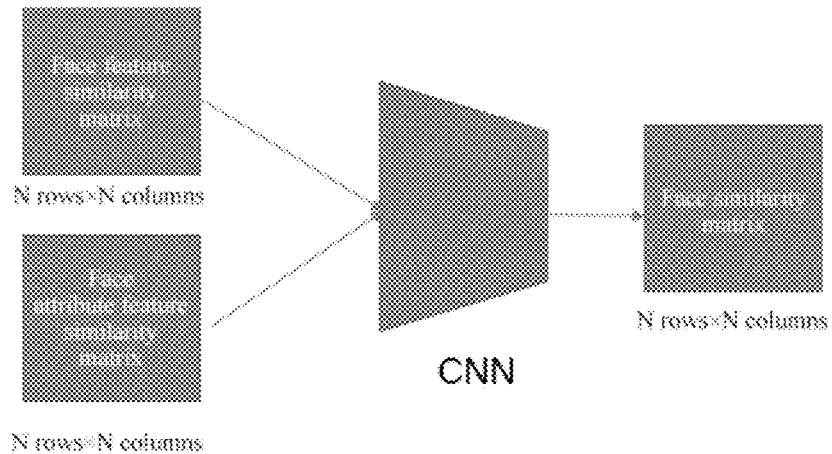
FIG. 8 is a schematic structural diagram of a third neural network according to the embodiments of the present disclosure.

In some possible implementations, acquisition of the similarity matrix corresponding to the first class group may be performed through a third neural network. The third neural network may be a trained neural network corresponding to the similarity matrix of the optimized images obtained according to the input face feature similarity matrix and attribute feature similarity matrix. The third neural network may be a convolutional neural network. FIG. 8 is a schematic structural diagram of a third neural network according to the embodiments of the present disclosure. As shown in FIG. 8, the face feature similarity matrices and the attribute feature similarity matrices of N rows and N columns corresponding to the first class group can be input into the third neural network CNN, and a final similarity matrix corresponding to the first class group may be obtained through convolution processing of the third neural network. Because each element in the obtained similarity matrix integrates the face features and the attribute features, the similarity precision between the obtained images can be improved.

Figure 9:
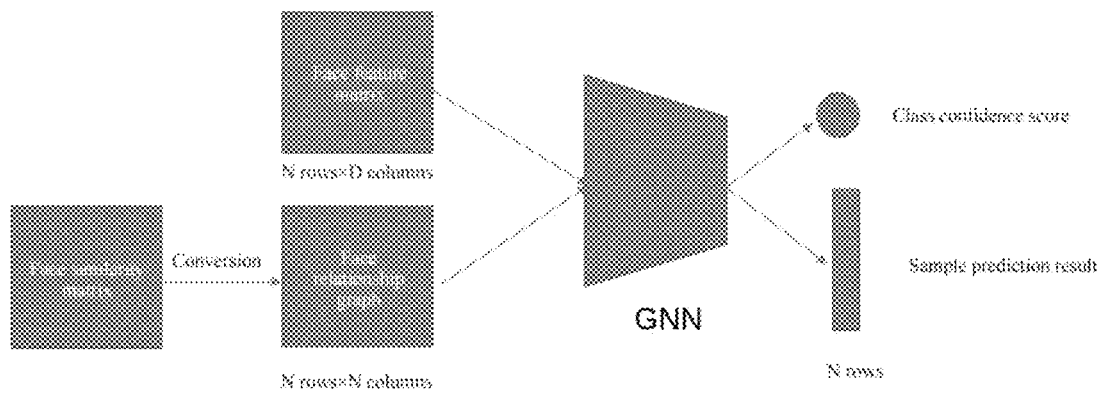
FIG. 9 is a schematic structural diagram of a graph convolution network according to the embodiments of the present disclosure.
Figure 10:
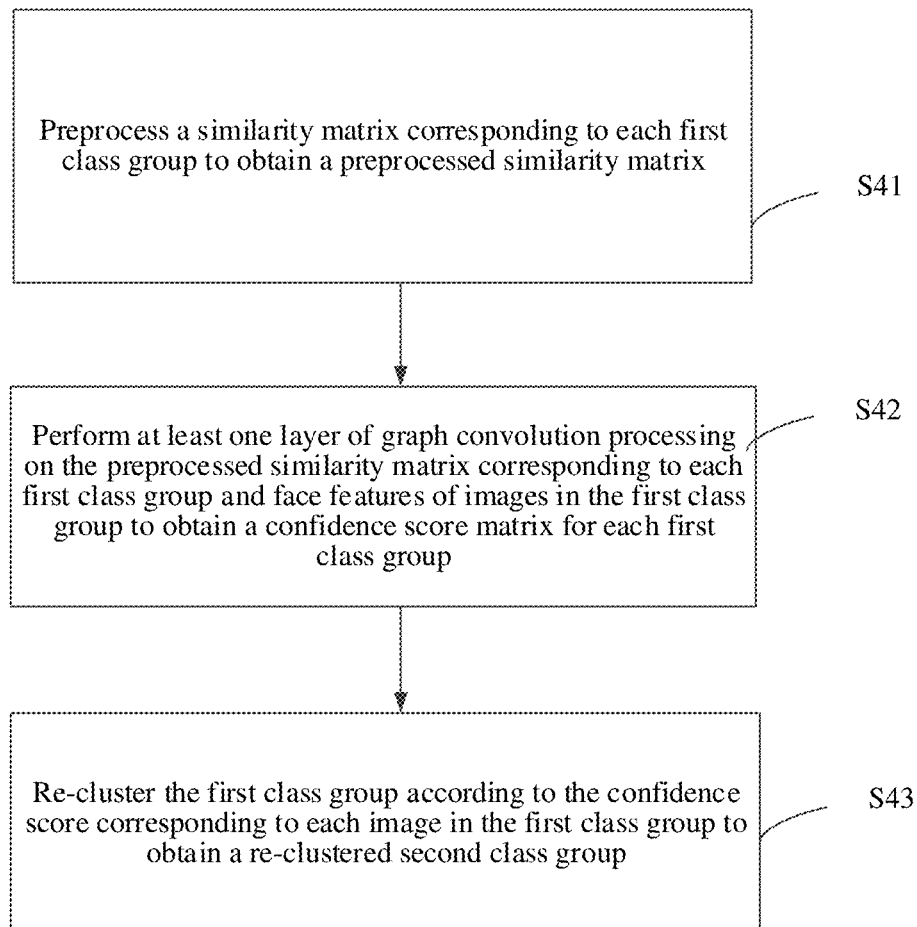
FIG. 10 is a flowchart of step S40 in an image clustering method according to the embodiments of the present disclosure.

After the similarity matrix corresponding to each first class group is obtained, step S40 may be executed. The clustering result of the first class group may be further optimized through the similarity matrix corresponding to the first class group and the face features corresponding to the images in the first class group, i.e., re-clustering. In the embodiments of the present disclosure, the re-clustering process may be performed in a graph convolution manner. FIG. 9 is a schematic structural diagram of a graph convolution network according to the embodiments of the present disclosure. FIG. 10 is a flowchart of step S40 in an image clustering method according to the embodiments of the present disclosure. Re-clustering the images in each first class group based on the similarity matrix corresponding to each first class group and the face features of the images in each first class group, i.e., re-clustering the images in each first class group based on the similarity matrix corresponding to each first class group and the face features of the images in each first class group to obtain at least one second class group (step S40), includes the following steps.

At S41, the similarity matrix corresponding to each first class group is preprocessed to obtain a preprocessed similarity matrix.

In the embodiments of the present disclosure, in performing the re-clustering of the first class group, pre-processing may be performed on the similarity matrix corresponding to the first class group, where the pre-processing may increase the similarity between images themselves in the similarity matrix, so as to distinguish the similarity between two different images. In the embodiments of the present disclosure, the pre-processing may be performed by adding a similarity matrix for each first class group and a unit matrix. For example, the similarity matrix may be represented as A, and the pre-processed similarity matrix may be expressed as: $\tilde{A} = A + I_N$ represented by formula (5), where $\tilde{A}$ represents a preprocessed similarity matrix, and $I_N$ represents a unit matrix, i.e., a matrix with an element value of the diagonal being 1, and the remaining elements being 0. The dimensions of the unit matrix and the similarity matrix are the same.

At S42, at least one layer of graph convolution processing is performed on the preprocessed similarity matrix corresponding to each first class group and the face features of the images in the first class group to obtain a confidence score matrix for each first class group, an element in the confidence score matrix representing a confidence score that the images in the first class group is allocated to the first class group.

In the embodiments of the present disclosure, assuming that the graph convolution processing includes x layers, the equation for the processing for each layer may be:

$$H^{(x+1)} = \sigma\left(\tilde{D}^{\frac{1}{2}} \tilde{A} \tilde{D}^{\frac{1}{2}} H^{(x)} W^{(x)}\right)$$

represented by formula (6), where $H^{(x)}$ represents an input feature for performing an x-th layer of graph convolution on images in a class group, and $H^{(x+1)}$ represents a result of performing the x-th layer of graph convolution on the images in the first class group, i.e., representing a classification confidence score of the images in the first class group. $\tilde{A}$ represents a pre-processed similarity matrix, and the element represented by D represents the sum of each row of elements in $\tilde{A}$, i.e., $$\tilde{D}_{ii} = \sum_j \tilde{A}_{ij}$$

represented by formula (7), i represents the number of rows, j represents the number of columns, $H^{(0)}$ represents the face features of the image, $W^{(x)}$ represents a convolution parameter of the x-th layer of graph convolution processing.

By means of the means above, $H^{(x+1)}$ resulting from the x-th layer of graph convolution processing is obtained, and $H^{(x+1)}$ represents a confidence score that each image is in the first class group in which the image is located. A confidence score matrix for each first class group may be formed based on the confidence score of each image.

At S43, first class groups are re-clustered according to the confidence score corresponding to images in first class groups to obtain a re-clustered second class group, i.e., the first class group is re-clustered according to the confidence score corresponding to each image in the first class group to obtain a re-clustered second class group.

In some possible implementations, because, at step S42, the confidence score that each predicted image should be allocated to the first class group in which the image is located is obtained, under the condition that the confidence score is low, it is indicated that the object in the image and the object corresponding to the first class group in which the image is located may not match, and in this case, the image may be deleted from the first class group.

Specifically, in the embodiments of the present disclosure, the image with the confidence score less than the second threshold value may be deleted from the first class group, so that the clustering precision of each image in the first class group may be ensured. The value of the second threshold may be set according to requirements, for example, 0.95, or other values, which is not specifically defined in the present disclosure By means of the means above, the first class group is re-clustered, and the images with a low confidence score are deleted, so as to obtain second class groups corresponding to the first class groups. Further, after deleting the images with a confidence score below the second threshold in all the first class groups to form the second class groups, if there are images that are not clustered into any second class group, the images that are not clustered into any second class group may form a second class group, respectively. Or, these images may also be further clustered according to face feature similarity between images that are not clustered into any second class group, for example, the images with a similarity greater than the second threshold are clustered into one second class group, which may improve image clustering precision. In some other possible implementations, in performing the graph convolution processing, a class confidence score corresponding to each first class group may also be obtained at the same time. The class confidence score may be used to represent a classification confidence score of the first class group, i.e., representing an overall clustering confidence score of the images in the first class group. If the class confidence score is low, the images in the corresponding first class group may not correspond to one object, or may correspond to a plurality of objects at the same time, i.e., the clustering precision is low. In the embodiments of the present disclosure, the highest confidence score in the confidence scores of the images in the first class group obtained at step S42 may be determined as the class confidence score for the first class group, or, an average value of the confidence scores of the images may also be used as the class confidence score for the first class group. In other embodiments, the class confidence score may also be obtained by other means, which is not specifically defined in the present disclosure. As long as the class confidence score can be used to represent the overall clustering precision of the first class group, the class confidence score can be used as an embodiment of the present disclosure.

In order to improve the precision of each re-clustered second class group, in the embodiments of the present disclosure, re-clustering is performed on the first class groups according to the confidence score corresponding to each image in the first class group. Before the re-clustered second class groups (re-clustering the first class group according to the confidence score corresponding to each image in the first class group to obtain a re-clustered second class group) are obtained, the first class groups with the class confidence score below the third threshold may also be deleted, i.e., the first class groups with the class confidence score below the third threshold do not retain. Similarly, selection of the third threshold is also not specifically defined in the embodiments of the present disclosure, for example, the third threshold may be 0.6 or other thresholds, which is not specifically defined in the present disclose.

Since, at step S20, in performing clustering processing, clustering of the first class group may be performed according to different thresholds, the diversity of samples in the first class group can be ensured, i.e., one image may be clustered into different class groups. Even if the image is deleted from the first class group or the whole first class group is deleted, the probability that the image can be accurately allocated to a corresponding class group may also be improved. The process of performing re-clustering in combination with the class confidence score is described in detail below.

Figure 11:
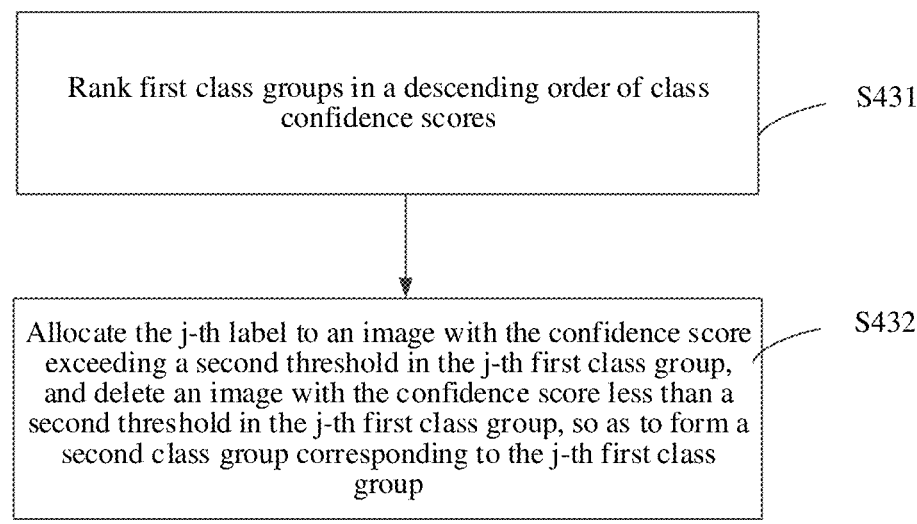
FIG. 11 is a flowchart of step S43 in an image clustering method according to the embodiments of the present disclosure.

FIG. 11 is a flowchart of step S43 in an image clustering method according to the embodiments of the present disclosure. Re-clustering first class groups according to the confidence score corresponding to images in first class groups to obtain a re-clustered second class group (i.e., re-clustering the first class group according to the confidence score corresponding to each image in the first class group to obtain a re-clustered second class group) includes the following steps.

At S431, first class groups are ranked in a descending order of the class confidence scores, i.e., the first class groups are ranked in a descending order of the class confidence scores.

As described in the embodiments above, the class confidence score of each first class group may be obtained simultaneously by performing graph convolution processing of the face features of the images in each first class group. After the class confidence score of each first class group is obtained, the first class groups may be ranked according to the class confidence score. In the embodiments of the present disclosure, the first class groups are ranked in a descending order of the class confidence scores.

At S432, the j-th label is allocated to an image with the confidence score exceeding the second threshold in the j-th first class group, and an image with the confidence score less than the second threshold in the j-th first class group is deleted, so as to form a second class group corresponding to the j-th first class group, where j is a positive integer greater than or equal to 1 and less than or equal to M, and M represents the number of the first class groups.

After the first class groups are ranked in a descending order of the class confidence scores, optimization clustering is performed on the first class groups respectively. Starting from the first class group with the highest confidence score, a first label may be allocated to the images with a confidence score higher than the second threshold in the first class group. The images with a confidence score greater than or equal to the second threshold may be determined to be the images having the same object as the object corresponding to the first class group, and in this case, a label may be allocated to the images to identify the images. However, no label is allocated to the images with a confidence score less than the second threshold, and the images with a confidence score less than the second threshold are deleted from the first class group with the highest confidence score. By means of the process, the optimization clustering of the first class group with the highest confidence score is completed, and a second class group corresponding thereto is obtained. In this process, since the first label is allocated to the images with a confidence score higher than the second threshold, the remaining same images in the first class group may be deleted. That is to say, if a label is allocated to one image, the image is clustered. In this case, the remaining same images in the first class group may be deleted and are not re-clustered.

After the optimization clustering is performed on the first class group with the highest class confidence score, the first class group with the second highest class confidence score may be re-clustered, and the process is the same as the process described above. A second label may be allocated to the images with a confidence score greater than or equal to the second threshold in the first class group with the second highest class confidence score. The images to which a second label may be allocated may be determined to be the images having the same object as the object corresponding to the first class group, and the second label may be used to identify the images. However, no label is allocated to the images with a confidence score less than the second threshold, and the images with a confidence score less than the second threshold are deleted from the first class group with the second highest class confidence score. By means of the process, the optimization clustering of the first class group with the second highest confidence score is completed, and a second class group corresponding thereto is obtained. In this process, since the second label is allocated to the images with a confidence score higher than the second threshold, the remaining same images in the first class group may be deleted. That is to say, if a label is allocated to one image, the image is clustered. In this case, the remaining same images in the first class group may be deleted and are not re-clustered.

Similarly, according to the process above, each first class group is re-clustered in a descending order of the class confidence scores, i.e., the j-th label is allocated to an image with the confidence score exceeding the second threshold in the j-th first class group, and an image with the confidence score less than the second threshold in the j-th first class group is deleted, so as to form a second class group corresponding to the j-th first class group, where j is a positive integer greater than or equal to 1 and less than or equal to M, and M represents the number of the first class groups. Moreover, after a label is allocated to an image in a first class group, the image is deleted from the remaining first class groups, so as to avoid the same image from being re-clustered.

By means of the means above, the re-clustering of each first class group is realized, and the clustering precision of the obtained second class group is improved. Further, in the embodiments of the present disclosure, after re-clustering processes of all the first class groups have been completed, there may be certain deleted images that are not allocated a label at all times, i.e., the images are not clustered into any second class group. In this case, these images may form a second class group respectively. Or, the face feature similarity of these non-clustered images may also be identified, respectively. If the similarity is higher than the first threshold, the images with a similarity higher than the first threshold may be clustered together to form a second class group. Therefore, the clustering precision can be further improved.

In conclusion, in the embodiments of the present disclosure, images may be preliminarily clustered according to face features of the images, and then, optimization clustering is performed on the result of the preliminary clustering by using the face features and the attribute features corresponding to the images simultaneously, thereby increasing a similarity between intra-class images, reducing a similarity between inter-class images, and improving clustering precision.

A person skilled in the art can understand that, in the foregoing methods of the specific implementations, the order in which the steps are written does not imply a strict execution order which constitutes any limitation to the implementation process, and the specific order of executing the steps should be determined by functions and possible internal logics thereof.

It may be understood that the foregoing method embodiments mentioned in the present disclosure may be combined with each other to obtain a combined embodiment without departing from the principle and the logic. Details are not described in the present disclosure due to space limitation.

In addition, the present disclosure further provides an image clustering apparatus, an electronic device, a computer-readable storage medium, and a program. The foregoing are all used to implement any image clustering method provided in the present disclosure. For corresponding technical solutions and descriptions, refer to corresponding descriptions of the method. Details are not described again.

Figure 12:
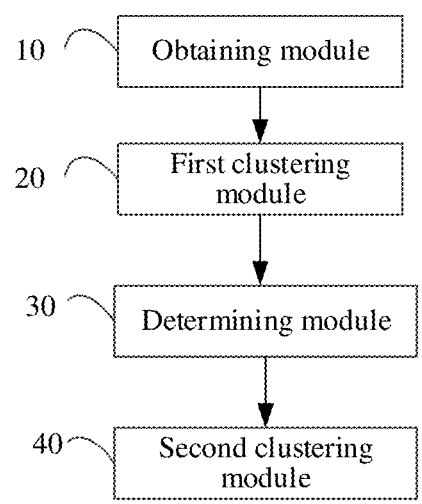
FIG. 12 is a block diagram of an image clustering apparatus according to the embodiments of the present disclosure.

FIG. 12 is a block diagram of an image clustering apparatus according to the embodiments of the present disclosure. As shown in FIG. 12, the image clustering apparatus includes:

an obtaining module 10, configured to obtain a face feature and an attribute feature of each image in an image set;

a first clustering module 20, configured to perform clustering processing on the image set by using a similarity of the face feature of each image in the image set to obtain at least one first class group, images included in each first class group being predicted images including a same object;

a determining module 30, configured to determine a similarity matrix for each first class group by using the face features and the attribute features of the images in each first class group, each element in the similarity matrix representing a respective one of similarities between images in the corresponding first class group; and a second clustering module 40, configured to re-cluster the images in each first class group based on the similarity matrix corresponding to each first class group and the face features of the images in each first class group to obtain at least one second class group, images in the second class group being optimized predicted images having a same object.

In some possible implementations, the first clustering module is further configured to:

determine similarities between the face features of all images in the image set;

determine K images with the highest face feature similarity to the each image based on the similarities of the face feature, K being an integer greater than or equal to 1;

select a first image with the face feature similarity exceeding a first threshold from the K images with the highest face feature similarity to the each image; and form a first class group according to the image and the corresponding first image thereof.

In some possible implementations, a plurality of first thresholds is included, and the first clustering module is further configured to, for different first thresholds, form a first class group corresponding to each of the first thresholds.

In some possible implementations, the determining module includes:

a first determining unit, configured to determine a face feature similarity matrix for each first class group based on the similarities between the face features of the images in the corresponding first class group, each element in the face feature similarity matrix representing a respective one of similarities between the face features of the images in the first class group;

a second determining unit, configured to determine an attribute feature similarity matrix for the corresponding first class group based on the attribute features of the images in each first class group, each element in the attribute feature similarity matrix representing a respective one of similarities between the attribute features of the images in the first class group; and a third determining unit, configured to obtain the similarity matrix corresponding to each first class group according to the face feature similarity matrix and the attribute feature similarity matrix of each first class group.

In some possible implementations, the second determining unit is further configured to: determine an attribute feature similarity between the attribute feature of each image in the first class group and the attribute features of all images in the first class group; and determine the attribute feature similarity matrix for the first class group based on the similarities between the attribute features of all the images in the first class group.

In some possible implementations, elements in the i-th row of the face feature similarity matrix represent similarities between the face feature of the i-th image in the first class group and the face features of all the other images in the first class group; and elements in the i-th row of the attribute feature similarity matrix represent similarities between the attribute feature of the i-th image in the first class group and the attribute features of all the other images in the first class group; and i is an integer greater than or equal to 1 and less than or equal to N, and N represents the number of images in the first class group.

In some possible implementations, the similarity between the face features and/or the similarity between the attribute features is a cosine similarity.

In some possible implementations, the third determining unit is further configured to perform at least one layer of convolution processing on the face feature similarity matrix and the attribute feature similarity matrix of each first class group to obtain the similarity matrix corresponding to each first class group.

In some possible implementations, the second clustering module includes:

a preprocessing unit, configured to preprocess the similarity matrix corresponding to each first class group to obtain a preprocessed similarity matrix;

a graph convolution unit, configured to perform at least one layer of graph convolution processing on the preprocessed similarity matrix corresponding to each first class group and the face features of the images in the first class group to obtain a confidence score matrix for each first class group, an element in the confidence score matrix representing a confidence score that the images in the first class group is allocated to the first class group; and a clustering unit, configured to re-cluster the first class group according to the confidence score corresponding to each image in the first class group to obtain a re-clustered second class group.

In some possible implementations, the clustering unit is further configured to delete an image with the confidence score less than a second threshold from the first class group to obtain a re-clustered second class group.

In some possible implementations, the graph convolution unit is further configured to obtain a class confidence score for each first class group based on the graph convolution processing, the class confidence score representing a classification confidence score of the corresponding first class group; and the clustering unit is further configured to delete the first class group in response to a situation where the class confidence score of the first class group is less than a third threshold.

In some possible implementations, the clustering unit is further configured to: rank the first class groups in a descending order of the class confidence scores; and allocate the j-th label to an image with the confidence score exceeding the second threshold in the j-th first class group, and delete an image with the confidence score less than the second threshold in the j-th first class group, so as to form a second class group corresponding to the j-th first class group, where j is a positive integer greater than or equal to 1 and less than or equal to M, and M represents the number of the first class groups.

In some possible implementations, the clustering unit is further configured to, after obtaining the second class group corresponding to the M-th first class group, in response to the presence of one or more images in the image set that is not clustered into any second class group, form a second class group respectively based on the image that is not clustered into any second class group.

In some possible implementations, the preprocessing unit is further configured to add the similarity matrix corresponding to the first class group and a unit matrix to execute the preprocessing.

In some possible implementations, the obtaining module includes:

a first neural network, configured to obtain the face feature of each image in the image set; and a second neural network, configured to obtain the attribute feature of each image in the image set.

In some embodiments, functions or modules included in the apparatus provided in the embodiments of the present disclosure may be configured to perform the method described in the foregoing method embodiments. For specific implementation of the apparatus, reference may be made to descriptions of the foregoing method embodiments. For brevity, details are not described here again.

The embodiments of the present disclosure further provide a computer-readable storage medium having computer program instructions stored thereon, where the foregoing method is implemented when the computer program instructions are executed by a processor. The computer-readable storage medium may be a non-volatile computer-readable storage medium.

The embodiments of the present disclosure further provide a computer program product, where the foregoing method is implemented when the computer program product is executed by a processor. The embodiments of the present disclosure further provide an electronic device, including: a processor; and a memory configured to store processor-executable instructions; where the processor is configured to execute the method.

The electronic device may be provided as a terminal, a server, or devices in other forms.

Figure 13:
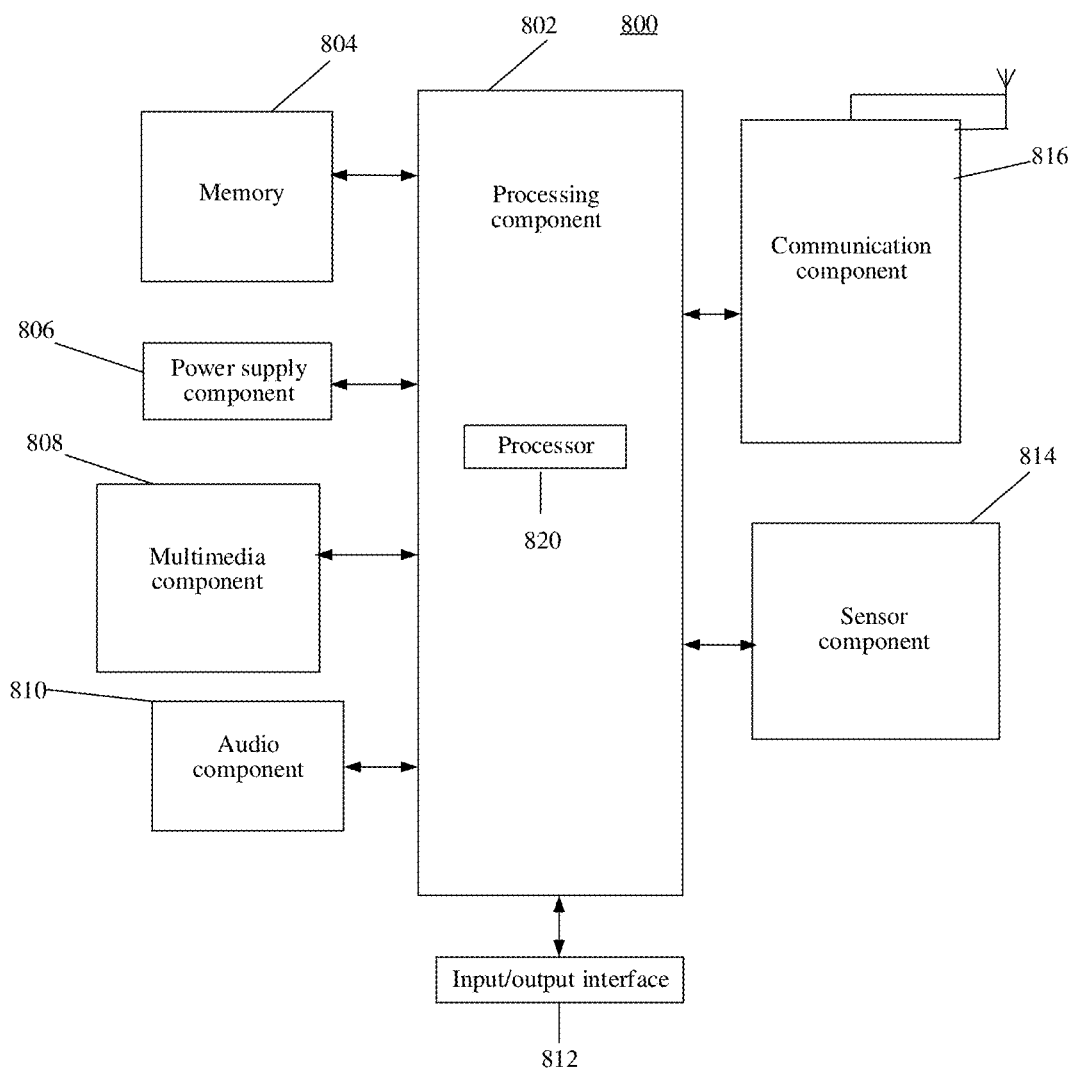
FIG. 13 is a block diagram of an electronic device 800 according to the embodiments of the present disclosure.

FIG. 13 is a block diagram of an electronic device 800 according to the embodiments of the present disclosure. For example, the electronic device 800 may be a terminal such as a mobile phone, a computer, a digital broadcast terminal, a message transceiving device, a game console, a tablet device, a medical device, exercise equipment, and a personal digital assistant.

With reference to FIG. 13, the electronic device 800 may include one or more of the following components: a processing component 802, a memory 804, a power supply component 806, a multimedia component 808, an audio component 810, an Input/Output (I/O) interface 812, a sensor component 814, and a communication component 816.

The processing component 802 generally controls overall operation of the electronic device 800, such as operations associated with display, phone calls, data communications, camera operations, and recording operations. The processing component 802 may include one or more processors 820 to execute instructions to implement all or some of the steps of the method above. In addition, the processing component 802 may include one or more modules to facilitate interaction between the processing component 802 and other components. For example, the processing component 802 may include a multimedia module to facilitate interaction between the multimedia component 808 and the processing component 802.

The memory 804 is configured to store various types of data to support operations on the electronic device 800. Examples of the data include instructions for any application or method operated on the electronic device 800, contact data, contact list data, messages, pictures, videos, and the like. The memory 804 may be implemented by any type of volatile or non-volatile storage device, or a combination thereof, such as a Static Random-Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a disk or an optical disk.

The power supply component 806 provides power for various components of the electronic device 800. The power supply component 806 may include a power management system, one or more power supplies, and other components associated with power generation, management, and distribution for the electronic device 800.

The multimedia component 808 includes a screen between the electronic device 800 and a user that provides an output interface. In some embodiments, the screen may include a liquid crystal display (LCD) and a touch panel (TP). If the screen includes the touch panel, the screen may be implemented as a touchscreen, to receive an input signal from the user. The touch panel includes one or more touch sensors to sense a touch, a slide, and a gesture on the touch panel. The touch sensor may not only sense a boundary of a touch operation or a slide operation, but also detect duration and pressure related to the touch operation or the slide operation. In some embodiments, the multimedia component 808 includes a front-facing camera and/or a rear-facing camera. When the electronic device 800 is in an operation mode, for example, a photography mode or a video mode, the front-facing camera and/or the rear-facing camera may receive external multimedia data. Each front-facing camera or rear-facing camera may be a fixed optical lens system that has a focal length and an optical zoom capability.

The audio component 810 is configured to output and/or input an audio signal. For example, the audio component 810 includes a microphone (MIC), and the microphone is configured to receive an external audio signal when the electronic device 800 is in an operation mode, such as a calling mode, a recording mode, and a voice recognition mode. The received audio signal may be further stored in the memory 804 or transmitted by means of the communication component 816. In some embodiments, the audio component 810 further includes a speaker for outputting the audio signal.

The I/O interface 812 provides an interface between the processing component 802 and a peripheral interface module, which may be a keyboard, a click wheel, a button, etc. These buttons may include, but are not limited to, a home button, a volume button, a startup button, and a lock button.

The sensor component 814 includes one or more sensors for providing state assessment in various aspects for the electronic device 800. For example, the sensor component 814 may detect an on/off state of the electronic device 800, and relative positioning of components, which are the display and keypad of the electronic device 800, for example, and the sensor component 814 may further detect a position change of the electronic device 800 or a component of the electronic device 800, the presence or absence of contact of the user with the electronic device 800, the orientation or acceleration/deceleration of the electronic device 800, and a temperature change of the electronic device 800. The sensor component 814 may include a proximity sensor, which is configured to detect the presence of a nearby object when there is no physical contact. The sensor component 814 may further include a light sensor, such as a CMOS or CCD image sensor, for use in an imaging application. In some embodiments, the sensor component 814 may further include an acceleration sensor, a gyroscope sensor, a magnetic sensor, a pressure sensor, or a temperature sensor.

The communication component 816 is configured to facilitate wired or wireless communications between the electronic device 800 and other devices. The electronic device 800 may access a wireless network based on a communication standard, such as WiFi, 2G, or 3G, or a combination thereof. In an exemplary embodiment, the communication component 816 receives a broadcast signal or broadcast-related information from an external broadcast management system by means of a broadcast channel. In an exemplary embodiment, the communication component 816 further includes a Near Field Communication (NFC) module to facilitate short-range communication. For example, the NFC module may be implemented based on radio frequency identification (RFID) technology, infrared data association (IrDA) technology, ultra-wideband (UWB) technology, Bluetooth (BT) technology, and other technologies.

In an exemplary embodiment, the electronic device 800 may be implemented by one or more of an Application Specific Integrated Circuit (ASIC), a Digital Signal Processor (DSP), a Digital Signal Processing Device (DSPD), a Programmable Logic Device (PLD), a Field Programmable Gate Array (FPGA), a controller, a microcontroller, a microprocessor, or other electronic components, and is configured to perform the foregoing method.

In an exemplary embodiment, a non-volatile computer-readable storage medium is further provided, for example, a memory 804 including computer program instructions, which can executed by the processor 820 of the electronic device 800 to implement the method above.

Figure 14:
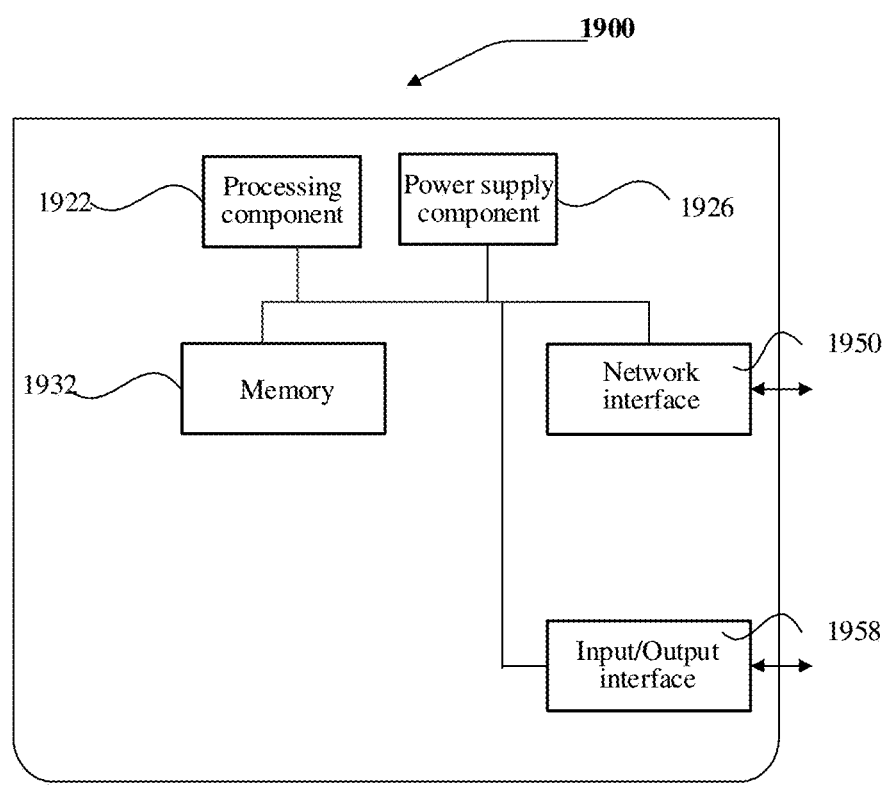
FIG. 14 is a block diagram of an electronic device 1900 according to the embodiments of the present disclosure.

FIG. 14 is a block diagram of an electronic device 1900 according to the embodiments of the present disclosure. For example, the electronic device 1900 may be provided as a server. With reference to FIG. 14, the electronic device 1900 includes a processing component 1922 which further includes one or more processors, and a memory resource represented by a memory 1932 and configured to store instructions executable by the processing component 1922, for example, an application program. The application program stored in the memory 1932 may include one or more modules, each of which corresponds to a set of instructions. Further, the processing component 1922 may be configured to execute instructions so as to execute the above method.

The electronic device 1900 may further include a power supply component 1926 configured to execute power management of the electronic device 1900, a wired or wireless network interface 1950 configured to connect the electronic device 1900 to the network, and an I/O interface 1958. The electronic device 1900 may be operated based on an operating system stored in the memory 1932, such as Windows Server™, Mac OS X™, Unix™, Linux™, or FreeBSD™.

In an exemplary embodiment, a non-volatile computer-readable storage medium is further provided, for example, a memory 1932 including computer program instructions, which can be executed by the processing component 1922 of the electronic device 1900 to implement the method above.

The present disclosure may be a system, a method, and/or a computer program product. The computer program product may include a computer-readable storage medium, and computer-readable program instructions that are used by the processor to implement various aspects of the present disclosure are loaded on the computer-readable storage medium.

The computer-readable storage medium may be a tangible device that can maintain and store instructions used by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. More specific examples (a non-exhaustive list) of the computer-readable storage medium include: a portable computer diskette, a hard disk, a Random Access Memory (RAM), an ROM, an Erasable Programmable Read-Only Memory (EPROM or Flash memory), a SRAM, a portable Compact Disk Read-Only Memory (CD-ROM), a Digital Versatile Disc (DVD), a memory stick, a floppy disk, a mechanically encoded device such as punch-cards or raised structure in a groove having instructions stored thereon, and any suitable combination of the foregoing. The computer-readable storage medium used here is not interpreted as an instantaneous signal such as a radio wave or another freely propagated electromagnetic wave, an electromagnetic wave propagated by a waveguide or another transmission medium (for example, an optical pulse transmitted by an optical fiber cable), or an electrical signal transmitted by a wire.

Computer-readable program instructions described herein can be downloaded to respective computing/processing devices from a computer-readable storage medium or to an external computer or external storage device via a network, for example, the Internet, a Local Area Network (LAN), a Wide Area Network (WAN) and/or a wireless network. The network may include a copper transmission cable, optical fiber transmission, wireless transmission, a router, a firewall, a switch, a gateway computer, and/or an edge server. A network adapter card or network interface in each computing/processing device receives computer-readable program instructions from the network and forwards the computer-readable program instructions for storage in a computer-readable storage medium within the respective computing/processing device.

Computer program instructions for carrying out operations of the present disclosure may be assembler instructions, Instruction-Set-Architecture (ISA) instructions, machine instructions, machine dependent instructions, microcode, firmware instructions, state-setting data, or either source code or target code written in any combination of one or more programming languages, including an object-oriented programming language such as Smalltalk or C++, and conventional procedural programming languages, such as the "C" programming language or similar programming languages. The computer-readable program instructions may be completely executed on a user computer, partially executed on a user computer, executed as an independent software package, executed partially on a user computer and partially on a remote computer, or completely executed on a remote computer or a server. In the case of a remote computer, the remote computer may be connected to a user computer via any kind of network, including a Local Area Network (LAN) or a Wide Area Network (WAN), or may be connected to an external computer (for example, connected via the Internet with the aid of an Internet service provider). In some embodiments, electronic circuitry including, for example, programmable logic circuitry, Field-Programmable Gate Arrays (FGPAs), or Programmable Logic Arrays (PLAs) may execute the computer-readable program instructions by using state information of the computer-readable program instructions to personalize the electronic circuitry, in order to implement the aspects of the present disclosure.

The aspects of the present disclosure are described herein with reference to flowcharts and/or block diagrams of methods, apparatuses (systems), and computer program products according to the embodiments of the present disclosure. It should be understood that each block of the flowcharts and/or block diagrams, and combinations of the blocks in the flowcharts and/or block diagrams can be implemented by computer-readable program instructions.

These computer-readable program instructions may be provided to a processor of a general-purpose computer, a special-purpose computer, or other programmable data processing apparatus to produce a machine, such that the instructions, when executed via the processor of the computer or other programmable data processing apparatus, generate an apparatus for implementing functions/actions specified in one or more blocks in the flowcharts and/or block diagrams. These computer-readable program instructions may also be stored in a computer-readable storage medium that can cause a computer, a programmable data processing apparatus, and/or other devices to function in a particular manner, such that the computer-readable medium having instructions stored thereon includes an article of manufacture including instructions which implement the aspects of the functions/actions specified in one or more blocks of the flowcharts and/or block diagrams.

The computer readable program instructions may be loaded onto a computer, another programmable data processing apparatus, or another device, so that a series of operations and steps are executed on the computer, the another programmable apparatus, or the another device, thereby generating computer-implemented processes.

Therefore, the instructions executed on the computer, the another programmable data processing apparatus, or the another device implement the specified functions/actions in one or more blocks in the flowcharts and/or block diagrams.

The flowcharts and block diagrams in the accompanying drawings illustrate the architecture, functionality and operations of possible implementations of systems, methods, and computer program products according to the embodiments of the present disclosure. In this regard, each block in the flowcharts or block diagrams may represent a module, a program segment, or a part of instruction, and the module, the program segment, or the part of instruction includes one or more executable instructions for implementing a specified logical function. In some alternative implementations, functions marked in the block may also occur in an order different from that marked in the accompanying drawings. For example, two consecutive blocks are actually executed substantially in parallel, or are sometimes executed in a reverse order, depending on the involved functions. It should also be noted that each block in the block diagrams and/or flowcharts and a combination of blocks in the block diagrams and/or flowcharts may be implemented by using a dedicated hardware-based system that executes specified functions or actions, or may be implemented by using a combination of dedicated hardware and a computer instruction.

The embodiments of the present disclosure are described above. The foregoing descriptions are exemplary but not exhaustive, and are not limited to the disclosed embodiments. For a person of ordinary skill in the art, many modifications and variations are all obvious without departing from the scope and spirit of the described embodiments. The terms used herein are intended to best explain the principles of the embodiments, practical applications, or technical improvements to the technologies in the market, or to enable other persons of ordinary skill in the art to understand the embodiments disclosed herein.

The invention claimed is:

1. An image clustering method, comprising:
   obtaining a face feature and an attribute feature of each image in an image set;
   performing clustering processing on the image set by using a similarity of the face feature of each image in the image set to obtain at least one first class group, images comprised in each first class group being predicted images comprising a same object;
   determining a similarity matrix for each first class group by using the face features and the attribute features of the images in each first class group, each element in the similarity matrix representing a respective one of similarities between images in a first class group corresponding to the similarity matrix; and
   re-clustering the images in each first class group based on the similarity matrix corresponding to each first class group and the face features of the images in each first class group to obtain at least one second class group, images in the second class group being optimized predicted images having a same object.

2. The method according to claim 1, wherein the performing clustering processing on the image set by using a similarity of the face feature of each image in the image set to obtain at least one first class group comprises:
   determining similarities between the face features of all images in the image set;
   determining, based on the similarities between the face features of all images in the image set, K images with top similarities to the face feature of each image in the image set, K being an integer greater than or equal to 1;
   selecting a first image with a face feature similarity exceeding a first threshold from the K images with top similarities to the face feature of each image in the image set; and
   forming a first class group according to each image in the image set and a first image corresponding to each image in the image set.

3. The method according to claim 2, wherein a plurality of first thresholds is comprised; and the performing clustering processing on the image set by using a similarity of the face feature of to each image in the image set to obtain at least one first class group further comprises:
   for different first thresholds, forming a first class group corresponding to each of the first thresholds.

4. The method according to claim 1, wherein the determining a similarity matrix for each first class group by using the face features and the attribute features of the images in each first class group comprises:
   determining a face feature similarity matrix for each first class group based on similarities between the face features of the images in a corresponding first class group;
   determining an attribute feature similarity matrix for each first class group based on the attribute features of the images in a corresponding first class group, each element in the face feature similarity matrix representing a respective one of similarities between the face features of the images in the first class group, and each element in the attribute feature similarity matrix representing a respective one of similarities between the attribute features of the images in the first class group; and
   obtaining the similarity matrix for each first class group according to the face feature similarity matrix for each first class group and the attribute feature similarity matrix for each first class group.

5. The method according to claim 4, wherein the determining an attribute feature similarity matrix for each first class group based on the attribute features of the images in a corresponding first class group comprises:
   determining an attribute feature of each image in the first class group and attribute feature similarities between the attribute features of all the images in the first class group; and
   determining the attribute feature similarity matrix for the first class group based on the similarities between the attribute features of all the images in the first class group.

6. The method according to claim 4, wherein elements in an i-th row of the face feature similarity matrix represent similarities between a face feature of an i-th image in the first class group and face features of other images in the first class group;
   elements in an i-th row of the attribute feature similarity matrix represent similarities between an attribute feature of the i-th image in the first class group and attribute features of other images in the first class group; and
   i is an integer greater than or equal to 1 and less than or equal to N, and N represents a number of the images in the first class group.

7. The method according to claim 4, wherein the similarity between the face features and/or the similarity between the attribute features is a cosine similarity.

8. The method according to claim 4, wherein the obtaining the similarity matrix for each first class group according to the face feature similarity matrix for each first class group and the attribute feature similarity matrix for each first class group comprises:
performing at least one layer of convolution processing on the face feature similarity matrix for each first class group and the attribute feature similarity matrix for each first class group to obtain the similarity matrix corresponding to each first class group.

9. The method according to claim 1, wherein the re-clustering the images in each first class group based on the similarity matrix corresponding to each first class group and the face features of the images in each first class group to obtain at least one second class group comprises:
preprocessing the similarity matrix corresponding to each first class group to obtain a preprocessed similarity matrix;
performing at least one layer of graph convolution processing on the preprocessed similarity matrix corresponding to each first class group and face features of images in a corresponding first class group to obtain a confidence score matrix for each first class group, each element in the confidence score matrix representing a confidence score that each image in the corresponding first class group is allocated to the first class group; and
re-clustering the first class group according to the confidence score corresponding to each image in the first class group to obtain a re-clustered second class group.

10. The method according to claim 9, wherein the re-clustering the first class group according to the confidence score corresponding to each image in the first class group to obtain a re-clustered second class group comprises:
deleting an image with a confidence score less than a second threshold from the first class group to obtain a re-clustered second class group.

11. The method according to claim 9, wherein the re-clustering the images in each first class group based on the pre-processed similarity matrix corresponding to each first class group and the face features of the images in each first class group to obtain at least one second class group further comprises:
further obtaining a class confidence score for each first class group based on the graph convolution processing, the class confidence score representing a classification confidence score of the corresponding first class group; and
before the re-clustering the first class group according to the confidence score corresponding to each image in the first class group to obtain a re-clustered second class group, the method further comprises:
deleting the first class group in response to the class confidence score of the first class group being less than a third threshold.

12. The method according to claim 11, wherein the re-clustering the first class group according to the confidence score corresponding to each image in the first class group to obtain a re-clustered second class group comprises:
ranking the at least one first class group in a descending order of the class confidence scores; and
allocating a j-th label to an image with a confidence score exceeding a second threshold in a j-th first class group, and deleting an image with a confidence score less than the second threshold in the j-th first class group, so as to form a second class group corresponding to the j-th first class group, wherein j is a positive integer greater than or equal to 1 and less than or equal to M, and M represents a number of the at least one first class group.

13. The method according to claim 12, wherein the re-clustering the first class group according to the confidence score corresponding to each image in the first class group to obtain a re-clustered second class group further comprises:
after obtaining a second class group corresponding to a M-th first class group, in response to the presence of one or more images in the image set that is not clustered into any second class group, form a second class group respectively based on the one or more images that are not clustered into any second class group.

14. The method according to claim 9, wherein preprocessing the similarity matrix corresponding to each first class group to obtain the pre-processed similarity matrix comprises:
adding the similarity matrix corresponding to each first class group with a unit matrix.

15. The method according to claim 1, wherein the obtaining a face feature and an attribute feature of each image in the image set comprises:
obtaining the face feature of each image in the image set by using a first neural network; and
obtaining the attribute feature of each image in the image set by using a second neural network.

16. An image clustering apparatus, comprising:
a processor; and
a memory configured to store processor-executable instructions, wherein
when the processor-executable instructions are executed by the processor, the processor is configured to:
obtain a face feature and an attribute feature of each image in an image set;
perform clustering processing on the image set by using a similarity of the face feature of each image in the image set to obtain at least one first class group, images comprised in each first class group being predicted images comprising a same object;
determine a similarity matrix for each first class group by using the face features and the attribute features of the images in each first class group, each element in the similarity matrix representing a respective one of similarities between images in a first class group corresponding to the similarity matrix; and
re-cluster the images in each first class group based on the similarity matrix corresponding to each first class group and the face features of the images in each first class group to obtain at least one second class group, images in the second class group being optimized predicted images having a same object.

17. The apparatus according to claim 16, wherein the processor is further configured to:
determine similarities between the face features of all images in the image set;
determine, based on the similarities between the face features of all images in the image set, K images with the top similarities to the face feature of each image in the image set, K being an integer greater than or equal to 1;
select a first image with a face feature similarity exceeding a first threshold from the K images with top similarities to the face feature of each image in the image set; and
form a first class group according to each image in the image set and a first image corresponding to each image in the image set.

18. The apparatus according to claim 17, wherein a plurality of first thresholds is comprised, and the processor is further configured to, for different first thresholds, form a first class group corresponding to each of the first thresholds.

19. The apparatus according to claim 16, wherein the processor is specifically configured to:

determine a face feature similarity matrix for each first class group based on similarities between the face features of the images in a corresponding first class group, each element in the face feature similarity matrix representing a respective one of similarities between the face features of the images in the first class group;

determine an attribute feature similarity matrix for each first class group based on the attribute features of the images in a corresponding first class group, each element in the attribute feature similarity matrix representing a respective one of similarities between the attribute features of the images in the first class group; and obtain the similarity matrix for each first class group according to the face feature similarity matrix for each first class group and the attribute feature similarity matrix for each first class group.

20. A non-transitory computer-readable storage medium, having computer program instructions stored thereon, wherein when the computer program instructions are executed by a processor, the following operations are performed:

obtaining a face feature and an attribute feature of each image in an image set;

performing clustering processing on the image set by using a similarity of the face feature of each image in the image set to obtain at least one first class group, images comprised in each first class group being predicted images comprising a same object;

determining a similarity matrix for each first class group by using the face features and the attribute features of the images in each first class group, each element in the similarity matrix representing a respective one of similarities between images in a first class group corresponding to the similarity matrix; and re-clustering the images in each first class group based on the similarity matrix corresponding to each first class group and the face features of the images in each first class group to obtain at least one second class group, images in the second class group being optimized predicted images having a same object.

* * * * *